(12) United States Patent
Arvin (10) Patent No.: US 7,377,731 B1
(45) Date of Patent: May 27, 2008

(54) CHAMFERING CUTTING TOOL OR GRINDING WHEEL AND METHOD OF MAKING AND USE THEREOF

(76) Inventor: Joseph L. Arvin, 13246 Wood Duck Dr., Plainfield, IL (US) 60544

( * ) Notice: Subject to any disclaimer, the term of this patent is extended or adjusted under 35 U.S.C. 154(b) by 0 days.

(21) Appl. No.: 11/657,897

(22) Filed: Jan. 25, 2007

Related U.S. Application Data (63) Continuation-in-part of application No. 11/514,492, filed on Sep. 2, 2006, now abandoned, and a continuation-in-part of application No. 10/310,417, filed on Dec. 5, 2002, now Pat. No. 6,939,093.

(60) Provisional application No. 60/713,975, filed on Sep. 2, 2005.

(51) Int. Cl.
*B23F 5/22* (2006.01)
(52) U.S. Cl. .......................... 409/12; 409/11
(58) Field of Classification Search .................. 409/11, 409/12, 13, 14, 15, 16, 17, 18, 19, 20, 21, 409/22, 23, 24, 50, 51, 56, 57; 407/20, 21, 407/22, 23, 24, 25, 26, 27, 28, 29; 451/9, 451/47, 48
See application file for complete search history.

(56) References Cited

U.S. PATENT DOCUMENTS

| | | | | |
|---|---|---|---|---|
| 3,720,989 | A * | 3/1973 | Ramond | 29/893.3 |
| 3,979,859 | A * | 9/1976 | Miller | 451/56 |
| 4,205,932 | A * | 6/1980 | Tennutti | 407/25 |
| 4,784,538 | A * | 11/1988 | Tlaker et al. | 409/35 |
| 5,114,287 | A * | 5/1992 | Ervay et al. | 409/13 |
| 5,205,679 | A * | 4/1993 | Nagata | 409/11 |
| 6,012,972 | A * | 1/2000 | Jankowski | 451/48 |
| 6,116,828 | A * | 9/2000 | Egawa et al. | 409/12 |
| 6,575,812 | B2 * | 6/2003 | Wirz | 451/9 |
| 6,839,953 | B2 * | 1/2005 | Fitzgerald et al. | 409/11 |
| 6,939,093 | B2 * | 9/2005 | Arvin et al. | 409/12 |
| 2003/0022601 | A1 * | 1/2003 | Shimomura | 451/47 |

* cited by examiner

*Primary Examiner*—Dana Ross
(74) *Attorney, Agent, or Firm*—Vangelis Economou; IPHorgan, Ltd.

(57) ABSTRACT

A work piece having edges comprising teeth, slots, dovetail, keyway or other irregularly shaped artifacts, can be provided with a uniform chamfer around the periphery of the work piece by bringing a grinding wheel or cutter in one single down feed at indexed intervals. The shape or profile of the grinding wheel or cutter is formed from an algorithm depending on the shape and dimensions of the work piece artifacts, such as gear teeth, etc., to provide the uniform chamfer at each slot of, for example, an internal or external gear wheel. A method of providing such a chamfer on irregularly shaped artifacts comprises forming a gear grinding wheel from the dimensions of the desired chamfer, and providing a chamfering tool or grinding wheel in accordance with an algorithm desired for the required chamfer, then bringing the gear chamfering tool in proximity to, and in contact with the edges of the work piece so as to produce a uniform chamfer on the sides and back edge. The method may include a step of moving of the cutter or grinding wheel from one side to another and tilting the cutter or grinding wheel to chamfer the back side.

9 Claims, 6 Drawing Sheets

CHAMFERING CUTTING TOOL OR GRINDING WHEEL AND METHOD OF MAKING AND USE THEREOF

CROSS REFERENCE TO RELATED APPLICATIONS

This is a continuation-in-part application of U.S. Ser. No. 11/514,492, filed on Sep. 2, 2006, now abandoned which is a continuation-in-part application of U.S. Provisional Patent Application Ser. No. 60/713,975, filed on Sep. 2, 2005, which is a continuation-in-part application of U.S. Ser. No. 10/310,417, filed Dec. 5, 2002, issued on Sep. 6, 2005 as U.S. Pat. No. 6,939,093, the specifications of which in their entirety are incorporated herein by reference.

BACKGROUND OF THE INVENTION

1. Field of the Invention

This invention relates generally to the deburring and precise chamfering of slots used in conjunction with gear teeth, spline teeth, dovetail slots, keyways, and other non-symmetrical shapes, internal or external, and more specifically, to the deburring and precise chamfering of gear teeth using a grinding wheel or cutter to provide a precise deburring or chamfering operation in a single feed or pass.

2. Background Art

Slots for gear teeth or other types of articles requiring chamfering or deburring are usually cut or milled in automated machines, sometimes referred to herein as hobbing machines. These machines operate on a usually cylindrical or disc-shaped gear blank by sequentially hobbing, milling, or broaching the gear teeth using a conventional commercially available machine tool. Examples of hobbing machines are described in U.S. Pat. Nos. 2,451,447, No. 3,130,642, No. 6,116,828, No. 4,961,289, No. 6,575,812 and No. 6,839,953. Most of these prior art machines operate on externally oriented gear teeth having essentially standard shapes.

When machining a work piece with gear teeth, dovetail slots, etc., the resulting teeth or slots have a burr and sharp edges following the initial hobbing, milling, or broaching operation. Accordingly, a second finishing operation is required to remove the burr and chamfer the edges of the work piece. It is generally undesirable to leave sharp edges on the work piece, because sharp edges and/or a non-uniform chamfer at the edges of the work piece causes stress risers or points on the work piece during its functional operation. These stress points usually are developed at the sharp corners or non-uniform chamfered work piece edges. Moreover, sharp edges or non-uniform chamfered work pieces can cause stress cracks leading to premature failure of the gear wheel or other part associated with the slot or gear tooth. Especially in aerospace applications, such as helicopters and airplanes, this can result in substantial risk of loss of human life. Chamfered edges on the corners of a work-piece generally produce an oblique angle and preferably the gear teeth surfaces are at a 45° angle relative to the slot at the end faces.

Methods have been developed by gear manufacturers to address the problem of asymmetrically chamfered work pieces. For example, manual chamfering of the front or back edges of the work piece is performed by a person operating a hand grinder, which is one conventional method that is often used. Alternatively, the end edges of the work piece are chamfered using a stand-alone machine, for example a James deburring machine of Broomfield, Colo. in the U.S. or a Gratomat type deburring machine and equipment available from Rausch GmbH & Co. KG of Haan, Germany, or alternatively, a conventional contour milling machine. Both of these methods have been found to be unsatisfactory, however, due to the non-uniform chamfering produced by the Gratomat Deburring machine and the labor and wastage costs associated with contour milling. Moreover, hand chamfering operations using a hand grinder, even by a skilled operator, result in slight imperfections in the uniformity of the chamfer, which produce asymmetric chamfers on the work piece that can and do develop into stress cracks, eventually leading to premature failure of the gearbox or other equipment having the slotted element.

These alternative deburring methods are for the most part inefficient, mostly unproductive, and unnecessarily costly because of personnel and labor costs. The problems noted with hand chamfering typically result in up to 10% scrap and substantial rework, up to 30%, of hand chamfered products. Thus, what is considered necessary is equipment and an automated deburring/chamfering process that enable the work piece to have both a front and rear face chamfer provided by a single unit, that automatically produces uniform chamfers in slots of varying shapes, sizes so that the work piece can withstand the increased stresses of, and can be used in the high rotational speeds found in, aircraft and other aeronautical or aerospace applications.

Another method for chamfering the edges of gear teeth is disclosed in the aforementioned commonly owned U.S. Pat. No. 6,939,093, wherein a second hob for providing a sequential hob chamfering operation to the gear teeth is described. The hob chamfering process described is a vast improvement from the hand chamfering, and the other alternative methods described above, as it can provide a uniform chamfer around the complete periphery of a gear wheel in a quick and efficient process. Nevertheless, the hob chamfering process of the '093 patent has limitations in use, because it is not possible to utilize hob chamfering for certain applications, for example, non-standard gear teeth configurations, keyway or dovetail slots, or for internally oriented gear teeth for an internal gear wheel.

Most standard automated chamfering or deburring machines provide chamfers on gear teeth that extend outwardly from the gear diameter, that is, the chamfering is performed on gear cogs that extend outwardly from the central rotational axis of the gear wheel. A different set of considerations arise when the gear teeth extend from an outer diameter of the wheel inwardly toward the center of the gear wheel, or when the gear teeth are of a non-standard gear tooth shape, for example, when the gear is an external gear having spline teeth, or the slots between the teeth are in non-standard shapes, for example, dovetail shapes, etc. In such cases, it becomes more difficult or impossible to control the movement of an automated arm to obtain the correct orientation of the types of chamfer hobs or contour milling machines heretofore used by the prior art devices because the range of motion is limited by the dimensions of the slots and the size of the hob providing the chamfer.

Accordingly, the invention as described below and claimed herein provides for a grinding wheel or cutter which produces uniform chamfers on external and/or internal work pieces having external or internal gear teeth, or for slots having asymmetric or other non-standard shapes, for example, dovetail shapes. The grinding wheel or cutter is capable of providing such a uniform chamfer in a smooth, single pass with the grinding wheel feeding into the slot from only a single direction.

SUMMARY OF THE INVENTION

Accordingly, what is disclosed herein is the design of a cutter or grinding wheel which is used to uniformly produce a chamfered end having a chamfer angle at either a front face or a back face of an external or internal gear teeth, or both at a front and a back face of the gear wheel, or a component part with the slots between protruding elements having a non-standard shape. In one embodiment, a formed cutter or grinding wheel rotates on an air or electric driven spindle, such that the radially outward surface of the grinding wheel defines a diameter "d", and a grinding wheel radius "r". In another aspect of the invention, the rough hobbed shape of the slot is either measured or mathematically determined with respect to the radial distance from the rotational axis of the gear wheel, either with respect to a mathematical model or alternatively by hand manual measurements, and a mathematical algorithm is provided that defines a precise shape of the grinding wheel or cutter that is calculated to provide a smooth and uniform chamfer of a desired shape and size around the complete edge of the gear wheel or other article.

The grinding wheel as described herein is ideally suited for providing a chamfered end to gear teeth disposed on an inner diameter of an annular gear wheel, the gear teeth being oriented in an inwardly facing direction, or alternatively, where the gear teeth define a dovetail shape of an externally oriented gear teeth arrangement, the gear wheel having a surface at a corresponding angle $\beta$ relative to r the chamfer desired on the gear teeth, wherein the parameters of the grinding wheel are defined according to the following equation:

$$r_a = (x_a^2 + R^2 - (2Rx_a \cos\beta))^{1/2}$$

where:

$R$ = the outer radius of the grinding wheel, $\beta$ = the angle between the grinding wheel dressing plane (extending radially) and the grinding plane, $x$ = the distance from the slot root to the corresponding slot width of the gear teeth, $r$ = the radius of the grinding wheel to the contact point on the workpiece in the grinding plane, $Y$ = Radial distance from the outside diameter of the grinding wheel to the corresponding point for the given slot width, and, for any particular slot width, $Y_a = R - r_a$.

The inventive method provides a cutter or grinding wheel capable of producing a chamfered end on both a front face and a back face of a gear. The disc or ball type cutter or grinding wheel is mounted on a spindle which is held and positioned by a gear grinding machine, cutter grinder, conventional or CNC machine tool, or via a robotic arm. The gear or work piece is held in a CNC indexable chuck and the cutter or wheel is used to chamfer one gear tooth or one slot at a time in a single pass. The work holding chuck then indexes the work piece, thereby positioning it for the cutter or wheel to chamfer the next tooth or slot in a subsequent pass. A significant advantage of the invention is that the cutter or wheel produces a uniform chamfer with one feed of the cutter or wheel, eliminating time consuming hand operations, scrap, rework and the operator breathing the air borne particles resulting form the hand chamfering operations that are entrained in the ambient air.

A significant advantage of this invention is that the cutter or grinding wheel produces a uniform chamfer with one in feed of the cutter or wheel. For complex, non-uniform work pieces like dove tail slots, the cutter or grinding wheel may require two to three passes to provide a chamfer to the entire slot periphery.

DETAILED DESCRIPTION OF THE PREFERRED EMBODIMENTS

Figure 1:
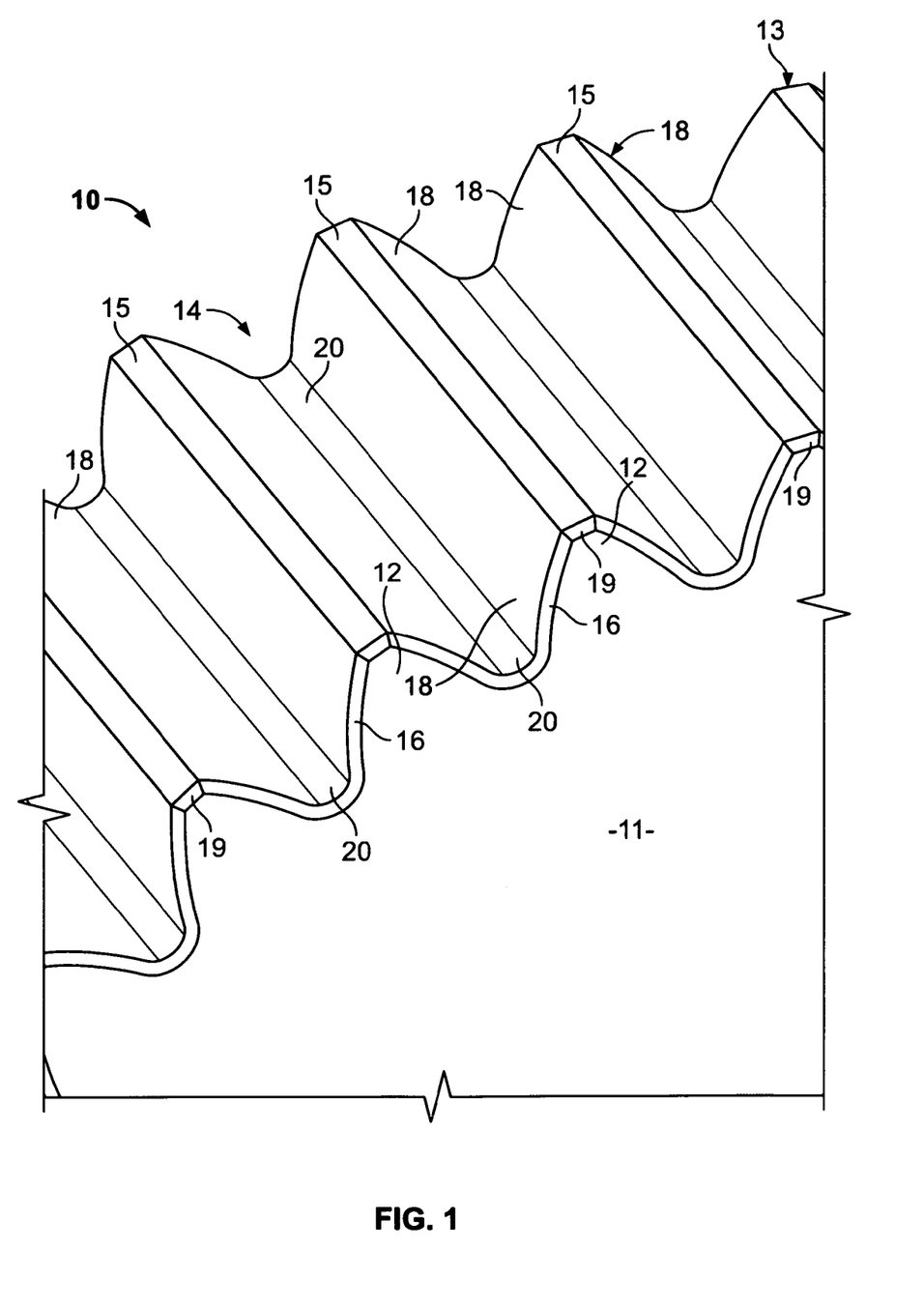
FIG. 1 illustrates, in a perspective, detail view, a final chamfered edge of a slot or groove disposed on an external gear wheel as produced by a first cutter or grinding wheel made according to the inventive method.

Referring now to FIG. 1, a perspective, detail view of an external gear wheel or ring 10 having gear teeth 12 defining slots 14 such that the gear wheel 10 may be suitable for various uses in a gear assembly. The present invention is capable of use with other types of gear wheels, as will be described in reference to the separate drawing figures, but the embodiment of gear wheel 10 shown in FIG. 1 is the simplest of the configurations and will be discussed first to provide a basis for expanding the scope of use of the invention to additional, more complex, arrangements.

Each of the slots 14 are defined by adjacent gear teeth 12, and the slots 14 and gear teeth 12 extend through the thickness of the gear wheel 10. The slots 14 are normally cut in a depth direction of the gear wheel 10 from a front face 11 all through the thickness of the gear wheel to a rear or back face 13. The slots 14 are normally cut by a hob (not shown) in a pass along the outer circumferential edge surface of the gear wheel 10, as is described in aforementioned U.S. Pat. No. 6,939,093. As seen in FIG. 1, the outer circumference surface 15 of the gear wheel 10 is the same original surface of the gear wheel blank before the slots 14 were cut. The junction of surfaces 15 and the front and back surfaces 11, 13 may be prepared for the chamfering procedure by first providing a bevel or outer diameter chamfer 19, as is described in U.S. Pat. No. 6,939,093, and as is also shown in FIG. 1 at the junction of surfaces 15 with surface 11.

Following the hobbing procedure to provide the sequential slots 14, the gear teeth 12 define a number of features or artifacts of the gear tooth arrangement. These include the top of the gear teeth 12 terminating at the outer circumferential surfaces 15, a pair of adjacent flank surfaces 18 on either side of each slot 14, and a root 20 of each slot 14.

After the slots 14 are completed around the complete circumference of the gear blank, chamfers 16 are provided in the edges of the slots 14 in accordance with the present invention. The chamfered edge 16 of each slot 14 is provided individually by a grinding wheel (FIG. 2A) made according to the present invention. In this respect, the chamfering procedure differs from that described in U.S. Pat. No. 6,939,093, which utilizes a hob that machines several slots simultaneously by the rotation of the gear wheel relative to the cutting teeth of the hob. The end product, the chamfer 16 in the edge of the gear slots 14 may be essentially identical, but each produces the slots in a significantly different way. Although the present invention produces the chamfers 16 individually, and the actual process takes a significantly longer amount of time to complete, the benefits of providing the chamfered edges according to the present invention will become apparent from the discussion of chamfers in non-standard slots, e.g., dovetail or keyway slots, as well as in internal gear wheels (FIG. 2A).

Figure 2A:
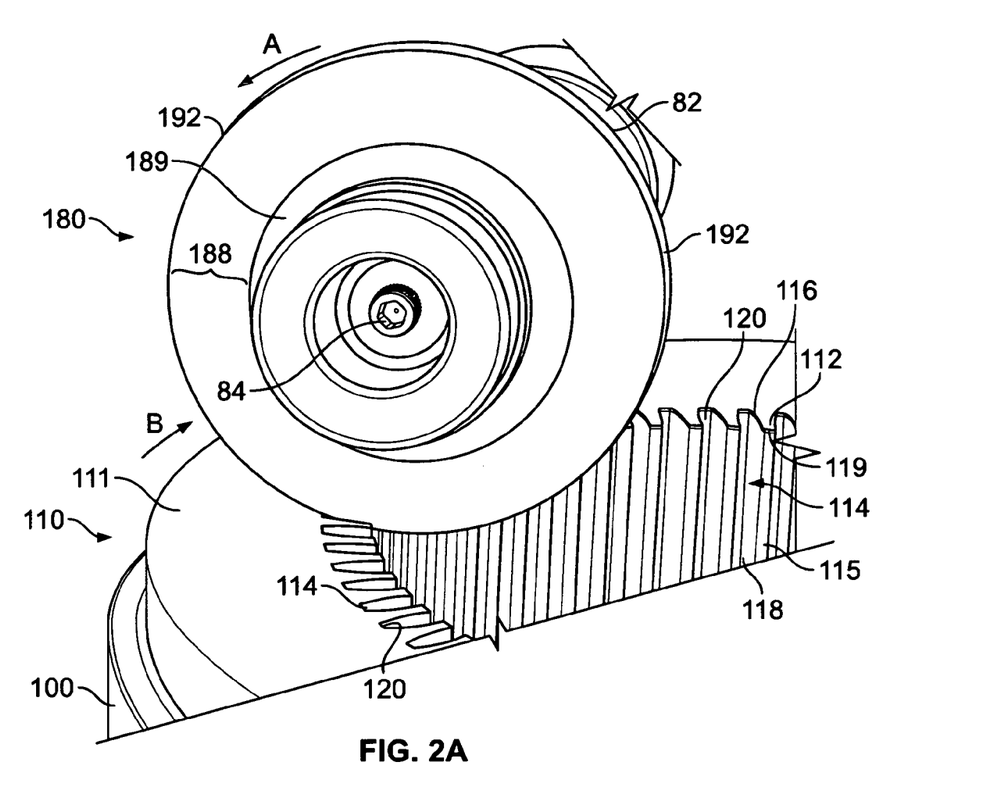
FIG. 2A illustrates, in a perspective view, a second cutter or grinding wheel according to the present invention mounted on a spindle and being used in a process according to the present invention for providing a uniform chamfer for an internal gear wheel having slots between internally extending gear teeth.
Figure 2B:
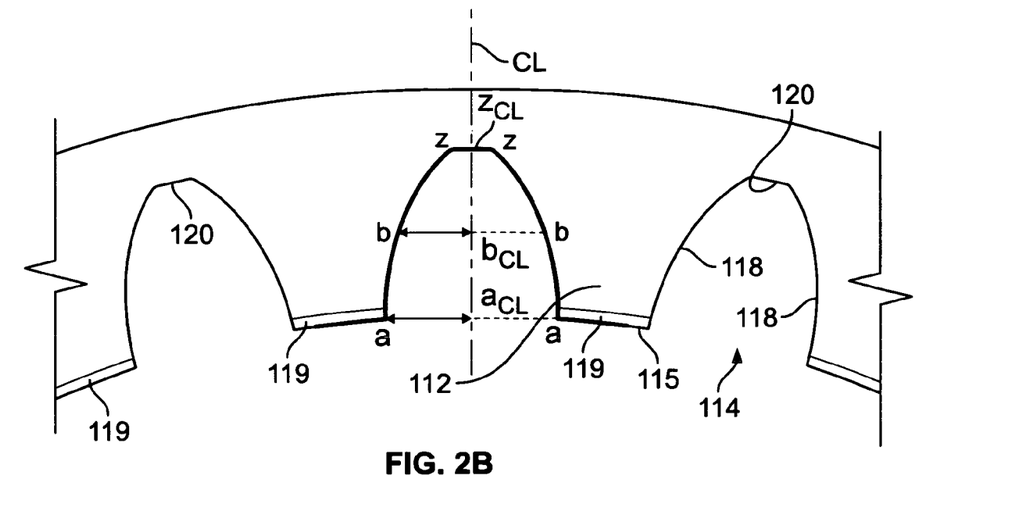
FIG. 2B illustrates a detailed plan view, in cross-section, of an internal gear wheel or ring having internally extending gear teeth and showing the taking of dimensional measurements at discrete points utilized in a process according to the present invention.

Referring now to FIGS. 2A and 2B, respectively, a perspective detail view and a detailed sectional view of an internal gear wheel or ring 110 having gear teeth 112 defining slots 114 are shown. It should be noted that the two views, although both showing internally oriented gear teeth 112, are not to scale. The slots 114 of the sectional view of FIG. 2B are much larger in proportion to the respective gear wheel 110 so as to permit greater clarity in the following explanation of the invention. Circumferential chamfers 119 may be provided in the internal peak or inner diameter surface 115 of each gear tooth 112 prior to the procedure of cutting the slots 114, in accordance with the procedure outlined in U.S. Pat. No. 6,939,093. The slots 114 are then cut or ground into the gear wheel blank in the desired shape and profile, to conform to the particular needs of the gear wheel arrangement, providing a root 120 and two adjacent flanks 118 at each edge of the slot 114.

The chamfer 116 of each slot 114 is provided at the edge of each gear slot 114 by a grinding wheel 80 (FIG. 2A) produced according to the present invention. Grinding wheel 80 is attached to a spindle 82 by an appropriate attachment, such as a bolt 84. The spindle 82 and the attached grinding wheel 80 rotate about a central axis in the direction of arrow A as the spindle 82 is powered by a motor or other rotating means (not shown). The up-down and sideways orientation and position of the spindle 82 is controlled, preferably automatically by a CNC machine, so that the grinding surface 88 of the grinding wheel 80 is brought against the desired slot edge, and so the grinding wheel can provide the desired chamfer 116. Alternatively, the grinding wheel may be used in conjunction with a gear grinding machine, a cutter grinder, a conventional milling machine, a CNC machine tool, including a robotic arm for manipulation of the tools, to provide the gear wheel chamfers. In the embodiment of FIG. 2A, the grinding wheel surface 88 is concave about a central plane CP to provide the convex slots, such as slots 114, most clearly shown in the detail view of FIG. 2B. After a chamfer is provided in a first slot 114, the gear wheel 110 is indexed in the direction of arrow B as shown to bring the next slot 114 into position for the chamfering operation on that slot.

FIG. 2A shows in a perspective view the operation of the grinding wheel 80 as the grinding surface 88 is brought around the complete periphery of the slot edge to produce the chamfer 116 simultaneously at each point of the edge periphery up to the circumferentially extending inner diameter 115. FIG. 2B shows in a somewhat enlarged scale the slot 114 and the dimensions that are calculated to provide the parameters of the grinding surface 88 of associated grinding wheel 80 that will produce the precise and uniform chamfer 116 around the slot edge.

Preferably, the measurements may be taken relative to a centerline or plane CL as shown to produce a profile or dimensional blueprint of the slot and its dimensions. This arrangement can provide the capability to the operator of having the slot asymmetric about the centerline (not shown) in which case, the grinding wheel will also be asymmetric. Alternatively, if the slot 114 is to be symmetric about the plane CL, then the measurements may be taken from one edge of a slot 114, across the width of that slot 114 to the other edge, as shown by the broken line, and thus a width measurement may be taken once at each radial value for that slot. If on the other hand, an algorithm is used to define the profile of the slot edge, then different algorithms may be used for asymmetric slot edges when the surface 88 of the grinding wheel will be different on each side of the center plane. If a chamfer is being provided for a symmetrical slot, one particular algorithm for each side of the grinding wheel may be provided, and the same profile, albeit a mirror image, can be defined by a change in sign indicating the difference in distance from the central plane.

An alternative, and preferred, method of providing a smooth gear wheel profile may be to utilize an Engineering CAD (computer aided design) system, for example, a Unigraphics System available from UGS of St. Louis, Mo., to develop a 3D solid model of the work piece. It is not uncommon that the work piece, for example, a gear wheel, may vary in some characteristics from the details listed on a blueprint and yet remain an acceptable work piece for its application. Thus, it may be necessary to have a digital model made of the actual work piece on a computerized measuring machine (CMM) and then transfer the digital model to the CAD system.

Figure 8A:
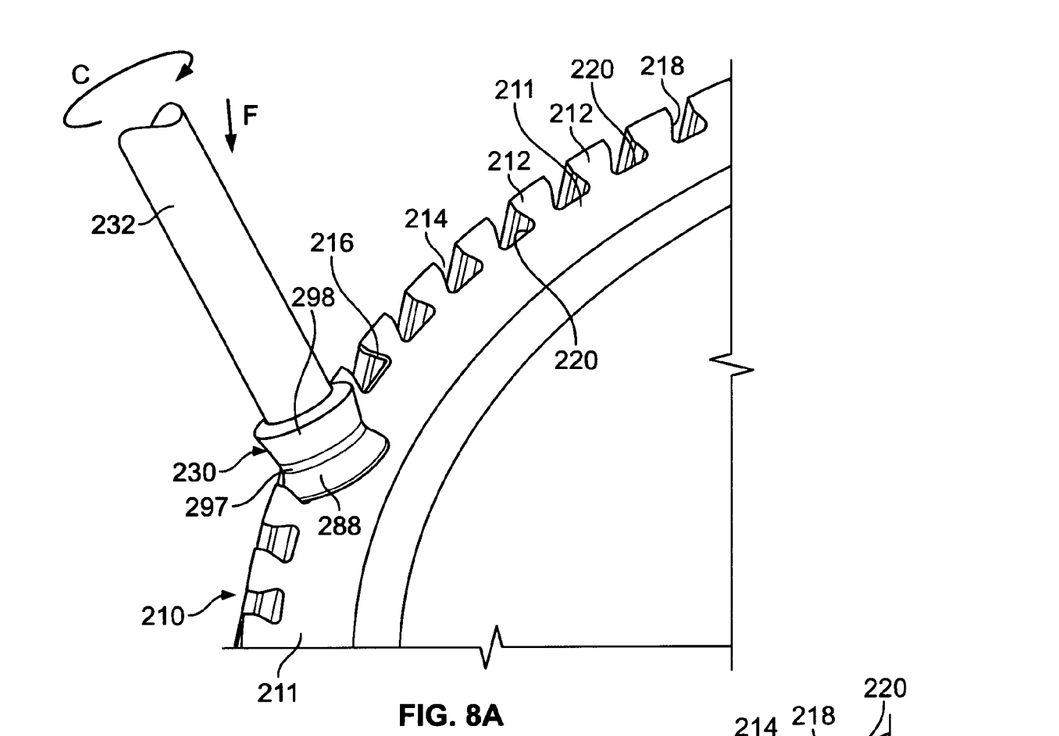
FIG. 8A illustrates, in a perspective view, an external wheel having a tooth arrangement including dovetail slots and showing a grinding wheel made in accordance with the present invention providing the chamfer on the root portion of the dovetail slot.
Figure 8B:
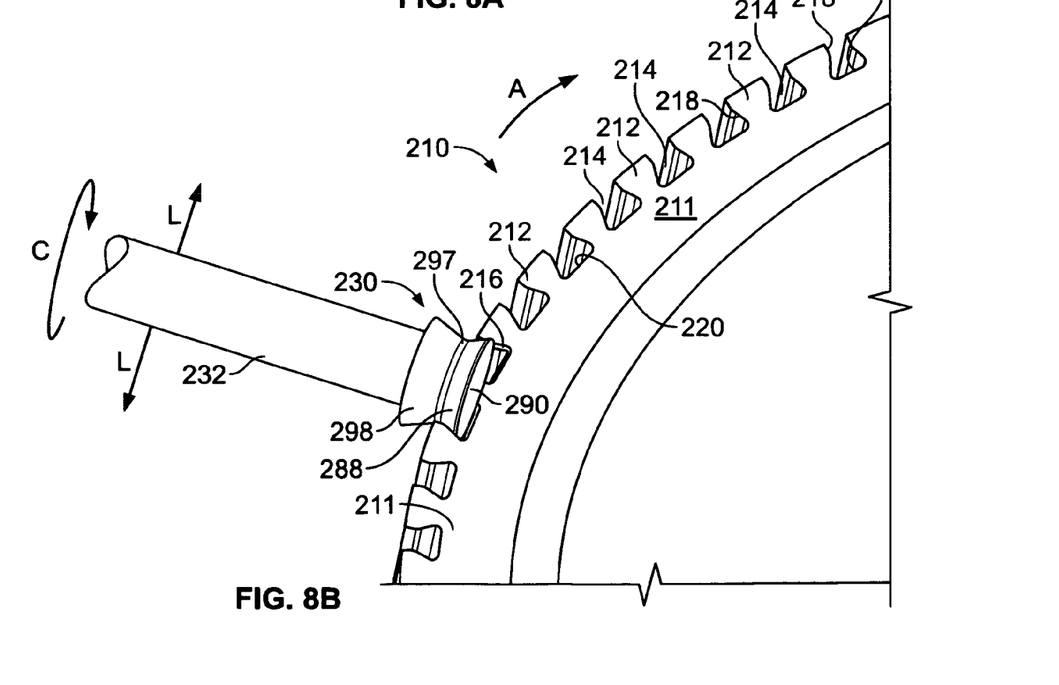
FIG. 8B illustrates, in a perspective view, an external wheel having a tooth arrangement including dovetail slots and showing a grinding wheel made in accordance with the present invention providing the chamfer on the flank portions of the dovetail slot.

Once a precise 3D model has been developed, and it precisely matches the final actual production parts, the required chamfer is now placed on the work piece 3D solid model in the locations, as required. This is a modeling of the work piece to ensure that the chamfer can be physically ground onto all the slot edges by a proposed process. This is not difficult for most common applications, for example, an outer diameter gear wheel 10 such as that shown in FIG. 1. However, for certain applications, for example, a dovetail slot gear wheel as shown in FIGS. 8A and 8B, the modeling may be required to provide a more complicated chamfering process to achieve a complete uniform chamfer all around the periphery of the slot.

FIG. 2B also is not to scale in order to better illustrate the procedure of measurement of the various dimensions of the slot 114 to produce the values for providing the related parameters of the associated grinding wheel. It should be noted that the grinding wheel 80, shown in FIG. 2A, has an outer radius R that is peaked so as to provide a chamfer 116 for a converging slot, as shown in FIG. 2A. However, the slot 114 shown in FIG. 2B has a flattened or truncated convergent slot that has a circumferentially extending root 120 with concave flanks 118. The illustrated configuration is suitable to provide a meshing of a corresponding external gear wheel (such as that shown in FIG. 3A) so that the completed gears provide an efficient transfer of rotary power without unduly sacrificing the strength or integrity of any particular gear tooth 12, 112.

The measurements of the width dimensions of the slots 114 are taken at specified radii of the gear wheel as measured from the axis of rotation. For ease in locating the exact radius point, the distance from the root 20, 120 of a slot 14, 114 to the top 15, 115 or diameter, whether inner or outer, is described as a correlative function of the gear wheel position $Wr_a$, $Wr_b$, ..., $Wr_z$, and the lateral width dimension aa, bb, ... zz, i.e., the distance between the slot edges 18, 118 of a slot 14, 114 as measured at the associated radial value. An example is described below, for a measured width profile aa taken at a radial value of $Wr_a$, to provide a clearer understanding of the process of how the profile of a gear slot 114 is measured, and then translated to a corresponding profile surface 88 of a grinding wheel 80 that can be used to provide a chamfer to that slot. The point is identified as "a", and is defined by the correlative function as a value of two axes. For ease in measurement, it may be easier to define the radial dimension Wr with reference to that whole depth D of the slot 114, that is, the dimension as measured from the slot top, which also is the inner diameter 115, to the root 120, and to measure the width of the slot a radial value Wr as the distance between the edges of slot 114 taken at that radius Wr.

In one embodiment, the radial distance measurement $Wr_a$ or the radial distance from the axis (not shown) of rotation of the gear wheel 110, is shown as being measured for an internal gear 110. The radial distance to point of wheel radius $Wr_a$ is taken along the centerline CL of the particular slot 114 being profiled. It should be noted that centerline CL passes through the radial axis of rotation of gear wheel 110 and if the slot 114 is symmetrical, as shown, the centerline for center plane CL is disposed in a central location with the slot 114 so as to provide a plane of symmetry. Thus, any measurements taken at Wheel radius $Wr_a$ may be taken either between the centerline CL and the edge of the slot 114, i.e., line a-$a_{CL}$, as shown in FIG. 2B. Alternatively, the measurement may be taken from the edge of one tooth 112 to the edge of an adjoining tooth 112, as shown by the broken line extension of line a-$a_c$ in FIG. 2B. Of course, if the slot 114 is asymmetrical, then the measurements of lines a-$a_{CL}$, b-$b_{CL}$ ... z-$z_{CL}$ may be different for each portion of the opposite side, shown in broken lines. These measurements can now provide a profile for either edge of each slot, which can be tabulated as points relative to the centerline CL. For example, at a radial value $Wr_a$, the width measurement is a-$a_c$, providing for coordinates ($Wr_a$, a-$a_{CL}$), b values are assigned at ($Wr_a$, b-$b_{CL}$), etc. The next step in the process is to transform these assigned values into a corresponding profile for the associated grinding wheel 80, (FIG. 2A), as will be explained below with reference to the similar calculations and transform performed on an external gear tooth wheel.

Figure 3A:
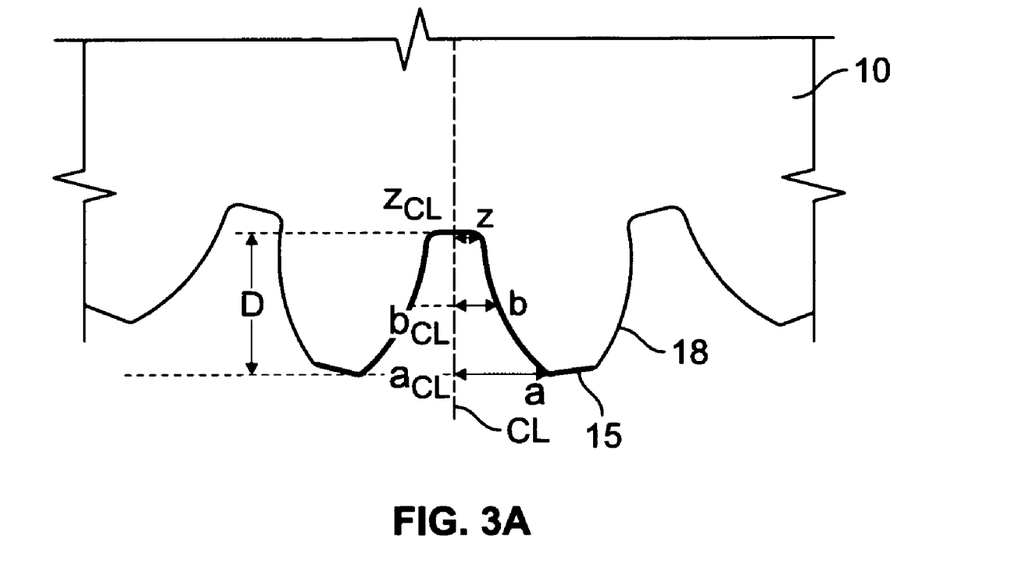
FIG. 3A illustrates a plan view, in cross-section, of an external gear wheel as in FIG. 1, in which a non-standard slot is defined by two adjacent teeth for an external gear arrangement showing how dimensional measurements are taken at discrete points for utilization in a process according to the present invention.
Figure 3B:
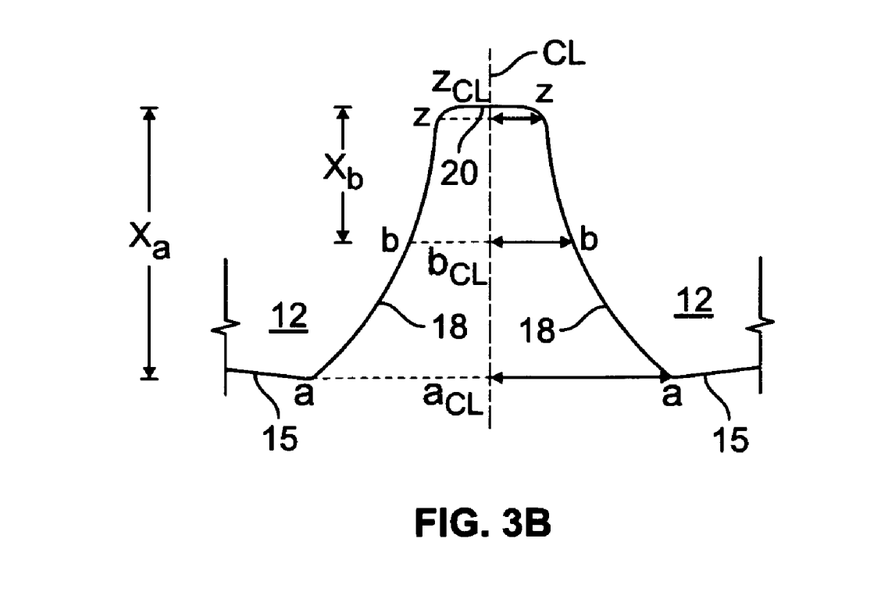
FIG. 3B is a detailed top view of the gear slot of FIG. 1 in which various dimensions are defined for the slot and of the related cutter or grinding wheel dimensions.

Referring now to FIGS. 1, 3A and 3B, an external gear wheel 10 is shown in which the slots 14 include flanks 18 that have a convex profile, in contrast to the concave profile of the slots 114 shown in FIG. 2B. As is clearly visible in the enlarged detail view of FIG. 3B, the measurement of aa, that is, the largest width measurement of the slot 14 taken at the outer diameter 15 of the gear wheel 10, is taken at a radial dimension of the gear wheel $Wr_a$, as measured from the axis of rotation of the gear wheel 10 (not shown). The measurement aa, for the symmetric slot 14 shown in FIG. 3B, is twice the distance of the measurement from the centerline CL to the point a, identified as a-$a_{CL}$. Therefore, to provide the appropriate value of the width dimension, the distance aa is divided by two to provide the width a-$a_{CL}$ that will be used in the standard calculation of the profile transform, as will be described below. The width measurements are then taken at each of several points, that is bb, cc ... zz, to provide the desired profile of the gear slot 14. Of course, it will be recognized by those having skill in the art that the transformation algorithm as described below for the centerline widths, i.e., a-$a_{CL}$, b-$b_{CL}$, etc., may be changed to accommodate measurements taken across the complete width, are used directly in the algorithm, thus avoiding the need to take separate measurements to the centerline CL at each radial value Wr.

The measurements are then tabulated, and if appropriate, a regressive Fourier transform may be utilized to produce a slot profile that is defined by an equation. Thus, the point plots may be used to generate a plotted profile of the associated grinding surface 88 of the grinding wheel 80 that is formed according to the transformed plotted profile, in accordance with the transform algorithm that will be described below. Alternatively, if the profile of the slot is generated by an equation, then the equation itself may be utilized in a transform of the algorithm to define the equation providing the desired profile and shape of the grinding wheel surface 88.

While an equation transform may provide for generation of a smoother surface profile, there may be instances where an equation may be difficult to generate for a grinding wheel surface 88, if the grinding wheel 80 is desired to make only a single pass. As will be described below in greater detail with respect to the dovetail slots illustrated in FIGS. 8A and 8B, a point by point plot transform may be easier to generate for a grinding wheel which is capable of providing a smooth uniform chamfer for non-standard slots over several passes.

Figure 4:
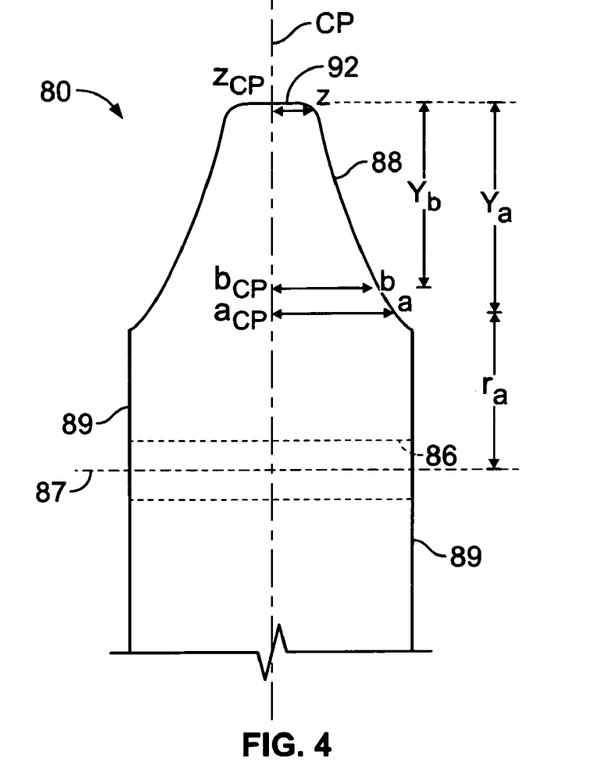
FIG. 4 is a detailed side view of a cutter or grinding wheel for providing a gear slot as shown in FIGS. 3A and 3B in which various dimensions are defined for the grinding wheel as related to the dimensions of the desired chamfer on the associated gear slot.
Figure 5:
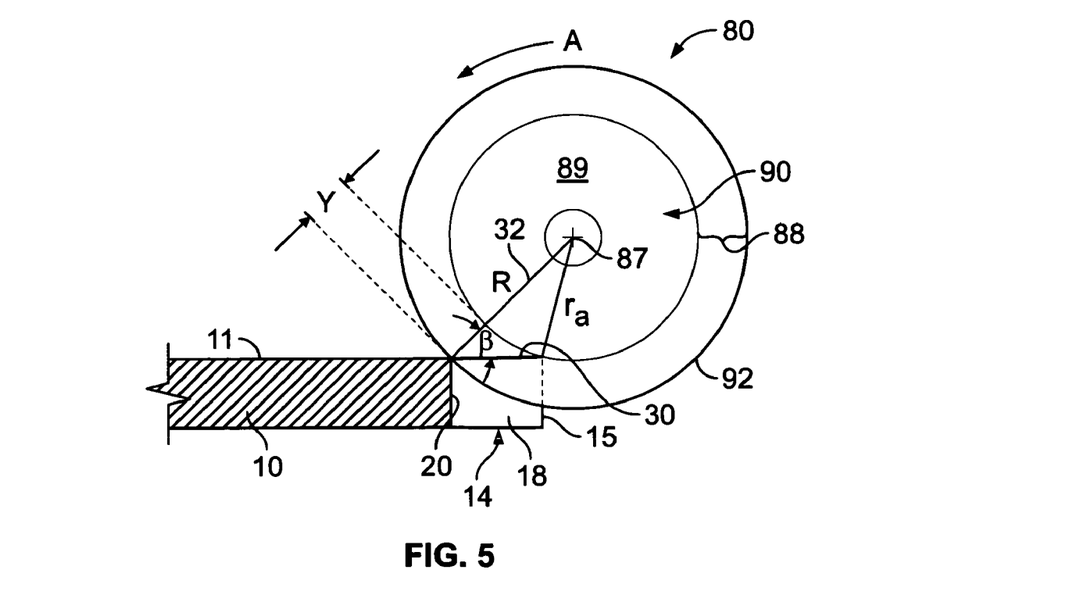
FIG. 5 is a side view of a gear wheel blank, in partial cross-section, and of a cutter or grinding wheel according to the present invention operating in a slot using a process according to the present invention for providing a uniform chamfer for a gear slot in which dimensions of the grinding wheel are defined.

Referring now to FIGS. 4 and 5, a cutaway side view of a grinding wheel 80, having a grinding surface 88 and an aperture 86, having an axis 87, is provided for receiving the spindle 82 (FIG. 5) about which the wheel 80 rotates. The spindle may be driven by any appropriate method, for example, by an electric motor, a hydraulic or pneumatic actuator, or may be air driven. The grinding surface 88 terminates at side walls 89 of the grinding wheel 80. The grinding wheel 80 of FIG. 4 is shown having a concave grinding surface 88 that will provide a chamfer for convex flank 18, as shown in FIGS. 3A and 3B. Grinding wheel 80 provides for a flattened top 92, which is shaped somewhat like a mesa, to produce a chamfer for a root 20 that also has a flattened shape, as shown in FIGS. 4A and 4B. The radial extent of the grinding surface 88 is also shown as having a longer longitudinal dimension than the corresponding slot 14 shown in FIGS. 3A and 3B, which is a necessary feature resulting from the angle β at which the grinding wheel 80 approaches the edge of the slot 14. However, it should be noted that the lateral or width dimensions correlate so that the grinding surface extend on either side of the central plane CP only slightly beyond the maximum width of the slot 114, As shown in FIG. 5, a gear wheel 10, in which slots 14 have already been formed, is ready for providing the chamfer to the slot edges. As shown, the wheel 80 on spindle 82 is rotating in the direction of the arrow around the axis 87 at a high rate of speed, and the spindle 82 is brought toward the edge of slot 14. While the spindle may be brought toward the slot edge at any angle, the preferred direction of movement referred to as the feed angle of spindle 82 is vertical. With a vertical feed angle, the wheel 80 is brought down from the above directly onto the slot 14. As the grinding wheel 80 is formed in accordance with the present invention, the grinding surface 88 contacts every point of the slot edge simultaneously to begin the chamfering process at the edge of the slot 14, as is shown in FIG. 5.

Figure 6A:
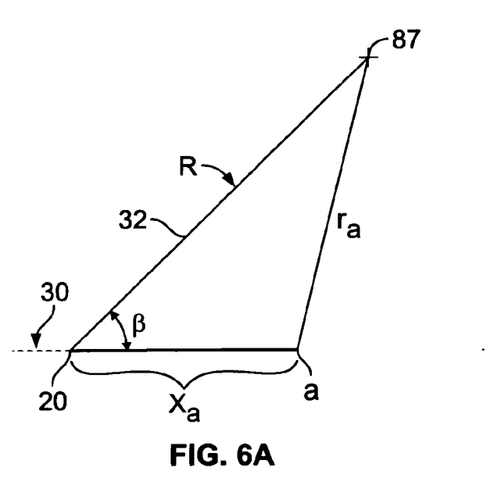
FIGS. 6A and 6B are representative graphs showing the relative dimensions of the slot and of the grinding wheel or cutter, as shown from the side of a cutter or grinding wheel as shown in FIG. 6 to provide the dimensional values utilized in the algorithm according to the present invention.
Figure 6B:
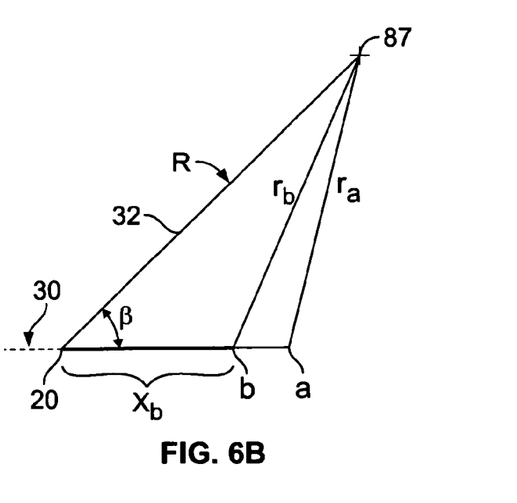

While the feed angle may be a parameter that is somewhat variable and not critical to the desired chamfer 16 (FIG. 1), the contact angle β of the wheel 80 relative to the side surface of the wheel 80, commonly referred to as the grinding plane 30, provides the angle of the chamfer 16 relative to the grinding plane which is also in the same plane as the side wall surface 11. The angle β, which is also the chamfer angle, is defined by the grinding plane surface 30 and the dressing plane 32, as shown in FIGS. 5, 6A and 6B. The dressing plane 32 is defined as the plane that passes through the axis of rotation 87 of grinding wheel 80, and also passes through the first contact point of the top or outer diameter 92 of grinding wheel 80 with the root 20 of the slot 14. Although the angle β can theoretically take any value between 0° and 90°, preferably it is in a range of from about 30° to about 60°, more preferably between about 37° and 50°, and most preferably the angle β is essentially 45. While the angle β is defined at the dressing angle taken at the root 20 of slot 14, the edge of slot 14 extends the whole depth D between the root 20 and the outer circumferential surface 15 of the external gear wheel 10. Thus, while the radial distance of the dressing plane to the root 20 is R, that is, the outer diameter 92 of the grinding wheel 80, the grinding plane 88 meets the slot edge at a progressively smaller radial distance $r_a$ from the wheel axis of rotation 87 at each point as measured from the root 20 toward the outer diameter surface 20.

Referring now to FIGS. 6A and 6B, the progression of different measurements $r_a$, taken at different points along the flank 88 (FIG. 5) of the wheel 10 is shown. For each point along the progression in the grinding plane 30 as taken from a (root 20) to z (O.D. 15) there is a different value for the radial distance $r_a$, which is calculated according to an algorithm. For example, at a hypothetical point b, as shown in FIG. 6B, the axial distance, that is, the frontal central plane CP of the grinding wheel 80, as shown in FIG. 4, is known from the measurement $b-b_{CL}$ taken on the gear wheel slot 14, as described above. Thus, the radial dimension $r_b$ is calculated, utilizing the appropriate algorithm, as set forth below, to determine the point plot. As a significant number of points, $a-a_{CL}$, $b-b_{CL}$, $C-C_{CL}$ ... $z-z_{CL}$, are plotted, a curve or profile of the grinding wheel surface 88 can be generated and profiled by an engineering CAD system to develop a 3D solid model of the profile. The profile of the grinding wheel 80 stored in the CAD program is then formed by known methods directly on a grinding wheel block (not shown), and the grinding wheel 80 is then ready to use in an automated machining station to provide the chamfer 16 (FIG. 1) to each slot 14.

The chamfering operation is straightforward once the profile surface 88 of the grinding wheel 80 has been established. Referring again to FIG. 2A, the grinding wheel 180 having a convex grinding surface 188, that is formed according to the profile established by the appropriate algorithm, is attached to a spindle 82 by a bolt 84 or other appropriate means, and the gear wheel 110, after the slots have been formed, is mounted and firmly affixed on the a base 100, which may comprise a CNC indexable chuck. The gear wheel, once firmly affixed to the base 100, may be then indexed relative to the position of the rotational central plane CP (FIG. 4) of the grinding wheel 80. The grinding wheel is then rotated in the direction of arrow A, and the spindle 82 is lowered so that the grinding surface 88 contacts the slot edge of slot 114. The spindle 82 continues in the same direction until a chamfer 116 of desired shape and size is produced simultaneously on the slot edge around the complete periphery of the slot 114, including on the root 120, and both flanks 118.

One alternative configuration to the shape of the grinding wheel 80 shown in FIG. 2A is possible based on the application and the need for accuracy in the chamfer that may be required. The grinding wheels 80, 180 are shown in FIGS. 2A and 4 as having a blunted point 92, 192, respectively, to match the flattened roots 20, 120 of the corresponding slots 14, 114 in gear wheels 10, 110. However, it is possible to provide the same effect and achieve the appropriate desired chamfer to the root 20 or 120 by providing a grinding wheel (not shown) that has a convergent top or outer diameter surface. To complete the chamfer along a flattened root 20, 120 with such a grinding wheel, it may be necessary to provide two passes or downward feeds of the grinding wheel at each flank 18, 118, and a separate intermediate grinding operation where the grinding wheel is transposed across the root so that the outer diameter can produce the appropriate flat portions of root 20, 120 shown in FIGS. 2B and 3A. A similar type of operation is described below with reference to the dovetail slot configurations which may also require more than one pass of the grinding wheel to achieve the uniform chamfer around the periphery of the slot. However, for reasons of efficiency and accuracy, it is usually preferable to provide the chamfer in a single downfeed stroke, as is described in greater detail herein.

Figure 7:
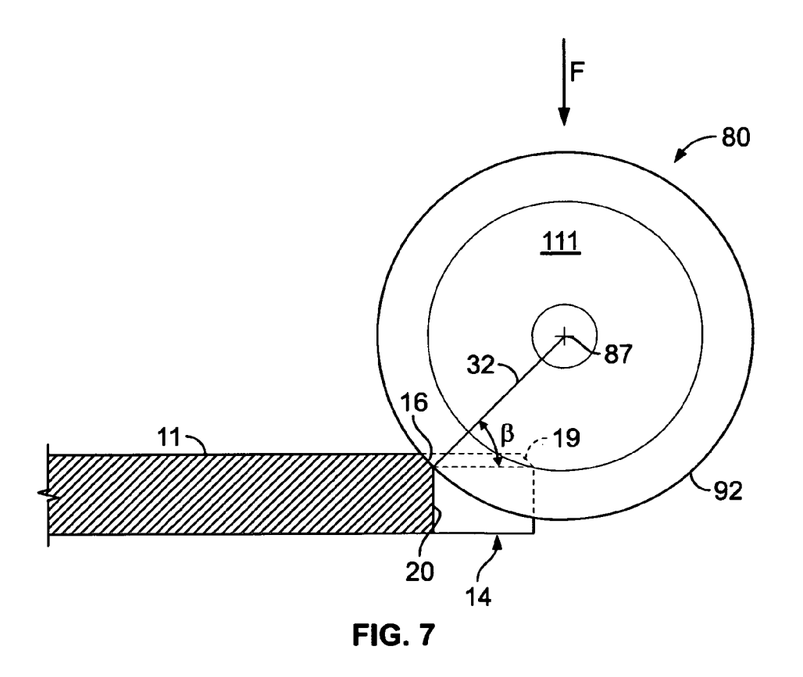
FIG. 7 is a side view of a gear wheel blank, in partial cross-section, and of a cutter or grinding wheel according to the present invention at a point completing the slot chamfering process according to the present invention for providing a uniform chamfer for a gear slot in which dimensions of the grinding wheel are defined.

As described above, a circumferential chamfer 119 has already been formed on the inner diameter of the slot 114, preferably prior to the cutting or forming of the slots 114, so that, as the downward feed stroke of the spindle 82 reaches its completion point, the chamfer 116 resulting from the grinding wheel 180 reaches the same level and size as the circumferential chamfer 119, which already extends at the top ends of each spline or tooth 112, to thereby provide a uniform chamfer around the periphery of each slot 114, which chamfer smoothly blends with the circumferential chamfer 119 at the circumferential surfaces at the top 115 of each gear tooth or spline that is between adjacent slots 114. This relationship is shown in FIG. 7, in the context of an external gear.

The next step is the upward retraction of the spindle 82 to a position above the side surface 111 of the gear wheel 110, and the indexing of the gear wheel 110 so that the next or adjacent slot 114 is disposed directly under the grinding wheel for the chamfering downward stroke of the spindle 82. The above described process is then repeated until all of the slots 114 have had the chamfering operation completed, and then the gear wheel 110 is removed and a new wheel (not shown) is affixed to the base 100 for the chamfering operations. Of course, a similar operation would occur for an external gear wheel, such as gear wheel 10 shown in FIG. 1 or 2A.

FIGS. 5, 6A, 6B and 7 illustrate schematically the grinding wheel surface position relative to the peripheral points of the slot edges, and also the profile transformation of the parameters of the slot to the corresponding profile and parameters of the grinding wheel. To avoid unnecessary complexity, a grinding wheel that is designed for an external gear wheel is used to illustrate the transform process, for example, to a provide a chamfer 16 around the periphery of each slot 14 of an external gear wheel, such as the external gear wheel 10 shown in FIGS. 1, 3A and 3B. Such a grinding wheel may have the profile shape as shown in the grinding wheel 80 of FIG. 4. However, it should be understood that the transform process can be used with equal effectiveness to provide a grinding wheel for grinding a uniform chamfer on other types of slots, such as a grinding wheel 180 used to provide a chamfer 116 to an internal gear wheel 110 having internal slots 114, such as those shown in FIGS. 2A and 2B or for non-standard slots, such as keyway or dovetail slots. Essentially, the same profile transformation calculations, with some modifications, can be used to provide chamfers 216 for non-standard slots, such as those described below with reference to the dovetail slots 214 of a gear 210, shown in FIGS. 8A and 8B.

As described above, the grinding wheel 80 is shown in FIG. 5 approaching the slot 14 so that the grinding surfaces 88, 92 all come into contact with the slot edge simultaneously to begin grinding the corner that is formed by the intersection of surfaces 11 and the surfaces defined by flank 18 and root 20. To obtain the precise shape and profile of the grinding wheel 80 which can perform the operation, the grinding wheel is formed in accordance with the following Equation (1) for each point a, b, . . . z, and for which point a is used as a typical plotted transform point:

$$r_a = (x_a^2 + R^2 - (2Rx_a\cos\beta))^{1/2} \quad \text{Equation (1)}$$

-continued
where:

$R$ = the outer radius of the grinding wheel 92, $\beta$ = the angle between the grinding wheel dressing plane 32 (extending radially) and the grinding plane 30, $x_a$ = the radial distance from the slot root 20 to the corresponding slot width, for example, $a - a_{CL}$ of the gear teeth taken in the grinding plane, $r_a$ = the radial distance of the grinding wheel 80 to the contact point a on the slot 14 of the workpiece in the grinding plane 30, and, for any particular slot width $a-a_{CL}$, Equation (2) can be used to calculate the radial dimension from the value of r as follows $$Y_a = R - r_a \quad \text{Equation (2)}$$

where Y is the radial distance from the outer diameter of the grinding wheel R (92) to the corresponding point on the grinding wheel surface 88 for the given slot width, which calculated value is provided for ease in measurement of the distances along the radial distances of the grinding wheel. That is, rather than requiring the plotting of each point from the axis of the grinding wheel, the value of Y is used to more accurately and easily provide the radial value of each plotted point as distance from the outer diameter 92.

It should be noted that for the value of point a, the distance to the outer diameter 15 of gear wheel 10 (FIG. 1) provides for the greatest slot width, and also for the smallest value calculated for the radial distance $r_a$, that is, the innermost radial distance of the grinding wheel surface 88 making contact with the outermost edge or circumferential diameter 15 of the gear wheel 10. These parameters define a converging profile to the grinding wheel 80 as the outer diameter 92 (R) is obtained, which corresponds to the divergent flank walls 18 of the slot 14 (FIGS. 3A and 3B).

Referring now to FIG. 6B, a second point is plotted, labelled point b, for a second radial value, measured at a second slot width $b-b_{CL}$ plotted with reference to the grinding plane 30. At point b, the distance from the root 20 to point b is labelled as $x_b$, which represents the radial value of the distance, measured in the grinding plane 30, taken with reference to the root 20. Of course, the value can be measured against any other reference point, for example, from the gear wheel axis (not shown) or from the outer diameter 15, and appropriate changes to the Equation (1) above may be made to take the different reference point into account. However, to provide the easiest measurement of the radial distance, it is considered that the measurement of $x_b$, correlated to the width $b-b_{CL}$ of slot 14 at point b, provides the most accurate measurements. Once the value of $x_b$ is determined, it is entered into the Equation (1) above, all other variables being known, the value of $r_b$ is calculated on the grinding wheel at the slot width $b-b_{CL}$. The radial width of the slot at the point b also is known, since it corresponds to the slot width $b-b_{CL}$, and so using the central plane of the grinding wheel CL (FIG. 5) and the axis of rotation 87 as the radial distance to the point b on the grinding wheel, the point b can be plotted.

For ease in calculation and measurement, rather than have to take the inconvenient measurements with reference to the axis of rotation 87 of the grinding wheel 80, once the value of $r_b$ has been calculated, it is referenced against the outer diameter value of 92 of the grinding wheel 80 having a radius value of R, as shown. The depth measurement is known as the whole depth of the slot 14, and is shown in FIG. 5 as the value Y. The dimension value of Y is defined by reference to R, in Equation (2) above, and is just the grinding wheel radius R less the distance of the calculated value of r taken from Equation (1) above. So for the value of $Y_b$, the distance from the outer diameter R or the top of the grinding wheel 92, as shown in FIG. 4, is only R-$r_b$. Thus the profile of the grinding wheel surface 88 is easier to establish by plotting against the outer diameter reference point.

Referring again to FIGS. 3A, 3B, 4, 5, 6B and 7, it becomes easy to see the calculation of R at the root 20. While the root 20 is established by definition, it is easy to calculate the value of r at that point because the value of $x_z$ is equal to 0 and the resulting calculation of the innermost diameter point z provides a value of $r_z$=R. That corresponds to the observed point z being the intersection of the outer diameter surface 92 of the grinding wheel 80 at the root 20 of the slot 14. Thus, the complete periphery of the slot, that is, all points along the flanks 18 and the root 20, come into contact with the grinding surfaces 88, 92 of the grinding wheel 80 at the same time. To complete the chamfer, then the spindle 82 (FIG. 1), having an axis that is parallel to the axis 87, is translated in a preferably downward feed, in the direction of the arrow F in FIG. 7, until the desired chamfer width is obtained. It may be necessary to calculate the downward distance that the spindle 82 must be translated to obtain a desired width of chamfer 16, but that is easily done by reference to the sine of the angle of attack β, as is described in the aforementioned U.S. Pat. No. 6,939,093.

Referring now to FIGS. 8A and 8B, successive stages of a process for providing a chamfer 216 in a dovetail slot 214 arrangement are shown. The ring 210 includes plural external dovetail teeth 212 defining the grooves of slot 214. Slots 214 include side flanks 218 which converge toward a slot opening at the outer diameter of the outer diameter wheel 210, and a flattened root 220 at the inner diameter of the slot 214. The dovetail slot 214, like a keyway slot (not shown) or other type of non-standard slot, may require that measurements be taken at successive radial positions, as described above, to obtain the values of the lateral width of the slot at that radial value. However, because of the non-standard shape, there may be a need to provide either a second grinding wheel on a second spindle that can be swapped out to reach the slot edges at the hard to reach corners of the slot, for example, the corner formed by root 220 and flanks 218, or other methods may be required to complete a chamfer for such non-standard geometries, as can be developed for specific applications.

However, the preferable method of providing a chamfer to a non-standard slot is to incorporate a grinding wheel, such as grinding wheel 230, which can be utilized to produce a chamfer 216 at more than one type of edge. The grinding wheel or button 230 is disposed at the end of a rotating spindle 232 having shape and dimensions such that portions of the grinding wheel 230 can easily fit within the recesses of the grooves 214 to grind the edges as needed to provide the desired bevel or chamfer 216.

An illustration of this type of chamfering procedure is shown in FIGS. 8A and 8B, in which there is a grinding wheel 230 having a diverging outer surface 288 at a distal end adjacent a flattened top 290 and a second converging surface 298 that extends from a common meeting point or circumference 297 between the surfaces 288, 298. As is shown in FIG. 8A, the first step in the process is to chamfer the flattened root 220 at the inner diameter edge of slot 214, where the root 220 intersects with the side surface of 211 of gear 210, by providing a single downfeed of the spindle 232 in the direction of arrow F so that the top 290 of the grinding wheel 230 (best seen in FIG. 8B) comes into contact with the flattened edge of slot root 220. The downward motion of the spindle 232 and grinding wheel 230 continues in the direction of arrow F for a sufficient distance so that the grinding wheel top 290 will provide the desired width of chamfer 216 at the slot root 220.

Following the completion of the root chamfer, the spindle 232, while still at its furthest downward feed point, traverses a line that is essentially circumferential along the flattened edge of the slot 214 at root 220, in the directions of arrows L, L, shown in FIG. 8B, so that the surfaces 288, 297 and 298 each contact the dovetail slot at the appropriate portions of flank 218 until the chamfer 216 is obtained at one side of slot 214, and then the wheel 230 is transferred again to the other flank 218 of slot 214 in the direction of arrow L, so that a chamfer 216 is obtained in the other side. Once the chamfer 216 is obtained all around the periphery of slot 214, then the spindle 232 lifts the grinding wheel 230 off of the gear 210 above the side surface 211 and the wheel is indexed in the direction of arrow B so that an adjacent slot 214 an be chamfered, as is described in reference to the external gear wheel 10 above.

Spindle 232 rotates in the direction of the arrow C, as shown, but it can rotate in the opposite direction, as per the desired application. It may also be caused to change the spinning direction to better grind the opposite flank 218. The spindle 232 is shown in cutaway and the opposite end is attached to a motor (not shown) that provides the motive power to rotate the spindle 232 and grinding wheel 230 to grind the edge of the groove 214. An appropriate material for the grinding wheel may be conventional, or for applications that require closer tolerances, may be made of any of a variety of materials, for example, dressable grinding wheels comprised of vitrified, dressable CBN wheels, carbide or diamond surfaced (CVD) wheels, available from Norton Co. of Arden, N.C.

The work pieces or gear wheels on which the grinding wheels 10, 110, 210 made according to the present invention can produce uniform chamfers can comprise a wide variety of materials and hardness, such as, but not limited to, soft plastics, aluminum, magnesium, cast iron, steels (through hardened or case hardened), nitriding steels and tool steels, etc. Depending on the material of the cutter or grinding wheel, and the application for which it will be used, the gear wheel hardness can range from zero Rc to 70 Rc hardness on the Rockwell 'C' scale. The chamfering cutting tool or chamfering grinding wheel can be made of a variety of simple or complex compounds, such as but not limited to, tool steel, which optionally may be coated, vitrified wheels, carbide steel wheels, CBN plated wheels, dressable CBN wheels, cobalt steel wheels or any material that will provide a smooth but abrasive surface that will not easily wear in the context of providing chamfers to slots of the gear wheels.

The invention herein has been described and illustrated with reference to the embodiments herein, but it should be understood that the features and use of the invention is susceptible to modification or alteration without departing significantly from the spirit of the invention. For example, the dimensions, size and shape of the various elements may be altered to fit specific applications. Similarly, the keyway slots or dovetail slots may be formed in a different shape or have different dimensions, as described above, or the internal elements to be chamfered may take a different shape. Again, the shape may be governed by the application, and the inventive system and method described and claimed herein may be modified to include several passes or manipulations of the cutter or grinding wheel during the chamfering process, as illustrated above for one possible embodiment of a dovetail slot. Alternatively, the slot may be asymmetrical about a radial plane extending through the axis of rotation of the gear wheel and through an inner diameter or root of the slot. Although preferred embodiments are described above for purposes of illustration and description, the invention is not to be considered limited by the above description, but is to be considered as including any modifications, changes and alterations and the invention is to be limited only by the following claims and their equivalents.

What is claimed is:

1. A chamfering grinding wheel for providing a chamfered end to gear teeth disposed on a diameter of an annular work piece, a work piece surface being modeled for a corresponding chamfer desired on the gear teeth, wherein the parameters of the grinding wheel are defined according to the following equation in reference to the parameters of the work piece and desired chamfer at a specified angle:

$$r_a = (x_a^2 + R^2 - (2Rx_a\cos\beta))^{1/2}$$

where:

$R$ = the outer radius of the grinding wheel, $\beta$ = the angle between the grinding wheel dressing plane (extending radially) and the grinding plane, $x$ = the distance from the slot root to the corresponding slot width at which measurement is made, $r$ = the radius of the grinding wheel to the contact point on the work piece in the grinding plane, $Y$ = radial distance from the outside diameter of the grinding wheel to the corresponding point for the given slot width, and, for any particular slot width at which measurement is made, $Y_a = R - r_a$, and having a chamfer angle at both a front face and a back face of a work piece.

2. The chamfering grinding wheel according to claim 1 wherein the chamfer angle β is in a range of from about 30° to about 60°.

3. The chamfering grinding wheel according to claim 1 wherein the chamfer angle β is in a range of from about 37° to about 50°.

4. The chamfering grinding wheel according to claim 1 wherein the chamfer angle β is approximately 45°.

5. A method of manufacturing a gear chamfering tool for providing a chamfered end on a face of a gear wheel, the chamfered end having a chamfer angle β, comprising the steps of:

a) modeling a chamfer for a slot, the slot being defined by splines, that chamfer being modeled on the corner edge of a gear wheel slot defined by the slot and the side surface of the gear wheel, the chamfer having a chamfer angle β, so as to provide a model of the parameters of a desired chamfer;

b) providing a gear chamfering tool based on the model parameters, and utilizing a transform for providing the parameters of the gear chamfering tool based on the following Equations:

$$r_a = (x_a^2 + R^2 - (2Rx_a\cos\beta))^{1/2}$$

where:

$R$ = the outer radius of the gear chamfering tool, $\beta$ = the angle between the gear chamfering tool dressing plane (extending radially) and the grinding plane, $x$ = the distance from the slot root to the corresponding slot width at which measurement is made, $r$ = the radius of the gear chamfering tool to the contact point on the gear wheel model in the grinding plane, $Y$ = radial distance from the outside diameter of the gear chamfering tool to the corresponding point for the given slot width, and, for any particular slot width at which measurement is made, $Y_a = R - r_a$.

6. The method of manufacturing a gear chamfering tool according to claim 5 wherein the modeling is provided by measuring the width of the slot at several gear wheel radii.

7. The method of manufacturing a gear chamfering tool according to claim 6 wherein the modeling is provided by measuring the dimension of the slot from the slot edge to a centerline of a symmetric slot, the measurements being made at several gear wheel radii.

8. The method of manufacturing a gear chamfering tool according to claim 6 wherein the modeling is provided by a curve defined by at lest one mathematical algorithm, the curve extending from a root of the slot to an outer diameter of the gear wheel.

9. A method of providing a chamfered end on at least one face of a gear wheel comprising the steps of:

a) providing a gear blank, the gear blank including a gear disk having a front face and a back face, each of the front and back faces having a gear edge, the gear blank having a plurality of gear teeth extending longitudinally from the front face to the back face, and defining a plurality of slots each disposed between two adjacent gear teeth;

b) providing a gear chamfering tool manufactured in accordance with the method of claim 5;

c) mounting the gear blank on a mount;

d) mounting the gear chamfering tool on a machine tool device for rotation therewith;

e) bringing the gear chamfering tool in proximity to and in contact with a gear tooth on one face of the gear blank so as to form a uniform chamfer around the one face edge of the gear teeth on the gear blank in a single down feed; and f) bringing the gear chamfering tool in proximity to and in contact with the edges of the gear tooth edge on the back face of the gear blank, thereby forming a uniform chamfer around the periphery of each slot in a single down feed on at least one face of the gear wheel.

* * * * *